(12) United States Patent
Miyamoto

(10) Patent No.: US 6,266,697 B1
(45) Date of Patent: Jul. 24, 2001

(54) SYSTEM AUTOMATICALLY MAINTAINING CLIENT UNDER CONTROL OF CLIENT, AND A RECORDING MEDIUM THEREFOR

(75) Inventor: Takashi Miyamoto, Tokushima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/227,088

(22) Filed: Jan. 5, 1999

(30) Foreign Application Priority Data

Mar. 17, 1998 (JP) .................................................. 10-067501

(51) Int. Cl.[7] .................................................... G06F 13/00
(52) U.S. Cl. .......................... 709/224; 709/219; 709/223; 709/226; 709/329
(58) Field of Search ..................................... 709/102, 104, 709/105, 203, 217, 218, 219, 223, 224, 226, 319, 329; 711/5, 6, 25

(56) References Cited

U.S. PATENT DOCUMENTS 5,704,031 * 12/1997 Mikami et al. ........................... 714/4
5,754,752 * 5/1998 Sheh et al. ................................ 714/4
5,774,668 * 6/1998 Choquier et al. ...................... 709/223
5,852,713 * 12/1998 Shannon ..................................... 714/6
5,930,824 * 7/1999 Anglin et al. .......................... 711/162
5,996,014 * 11/1999 Uchihori et al. ...................... 709/226
6,038,586 * 3/2000 Frye ...................................... 709/100

FOREIGN PATENT DOCUMENTS 8-272643   10/1996   (JP) .

* cited by examiner

Primary Examiner—Viet D. Vu
(74) Attorney, Agent, or Firm—Staas & Halsey LLP

(57) ABSTRACT

A server load judgment unit 214 of a client unit 2 judges the load state of a server unit 1 for executing repair/update processing to each client unit 2, by adding the content of a load condition file of the client unit 2 and the content of an update basic information file 13 of the server unit 1 to the content of a server load information file 14 of the server unit 1. Only when the server unit 1 has margin equal to or more than a certain level, the client unit 2 request repair/update processing to the server unit 1. As a result, it is possible to increase the number of clients without the need to review the capability of the server unit and that of the transmission path and then to redesign them.

9 Claims, 6 Drawing Sheets

FIG. 5

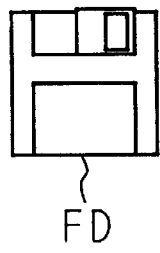
FD

| PC11: CAUSING CLIENT UNIT 2 TO DIAGNOSE AS TO WHETHER OR NOT FILE OF SOFTWARE STORED IN CLIENT SYSTEM FILE 21 NEEDS TO BE REPAIRED |
| --- |
| PC12: CAUSING CLIENT UNIT 2 TO STORE INFORMATION INDICATING LOAD OF SERVER UNIT 1 WHEN FILE DIAGNOSED AS REQUIRING REPAIR IS TO BE INSTALLED FROM BACKUP FILE 11 OF SERVER UNIT 1 |
| PC13: CAUSING CLIENT UNIT 2 TO DIAGNOSE AS TO WHETHER OR NOT FILE OF SOFTWARE FOR CLIENT SYSTEM FILE 21 NEEDS TO BE UPDATED |
| PC14: CAUSING CLIENT UNIT 2 TO JUDGE LOAD STATE OF SERVER UNIT 1 FROM CONTENT OF REPAIR LOG FILE 23, AND CONTENTS OF UPDATE BASIC INFORMATION FILE 13 AND SERVER LOAD INFORMATION FILE 14 OF SERVER UNIT 1 |
| PC15: CAUSING CLIENT UNIT 2 TO UPDATE CONTENT OF SERVER LOAD INFORMATION FILE 14 OF SERVER UNIT 1 WHEN LOAD STATE OF SERVER UNIT 1 THUS JUDGED FALLS WITHIN PREDETERMINED CONDITIONS |
| PC16: CAUSING CLIENT UNIT 2 TO READ FILE DIAGNOSED AS REQUIRING REPAIR PROCESSING AND FILE DIAGNOSED AS REQUIRING UPDATE PROCESSING FROM BACKUP FILE 11 AND UPDATE INFORMATION FILE 15 OF SERVER UNIT 1, AND TO STORE THEM IN CLIENT SYSTEM FILE 21 OF CLIENT UNIT 1 ITSELF WHEN LOAD STATE OF SERVER UNIT 1 THUS JUDGED FALLS WITHIN PREDETERMINED CONDITIONS |
| PC17: CAUSING CLIENT UNIT 2 TO READ FROM LOAD CONDITION FILE 24 PROVIDED TO CLIENT UNITS 2 THEMSELVES, AS PREDETERMINED CONDITION, AT LEAST ONE OF THE NUMBER OF CLIENT COMPUTERS CONNECTED TO SERVER UNIT 1 AND SIZE OF FILES TO BE TRANSFERRED TO CLIENT UNIT 2 |

SYSTEM AUTOMATICALLY MAINTAINING CLIENT UNDER CONTROL OF CLIENT, AND A RECORDING MEDIUM THEREFOR

BACKGROUND OF THE INVENTION

The present invention relates to a client/server system. More specifically, the present invention relates to an automatic maintenance technique for automatically maintaining a client under control of the client itself as well as a computer executing such self maintenance and a recording medium therefor.

In recent years, as the performance of general purpose computer such as a personal computer is enhanced, the client/server systems widely spread. Speaking of the client/server system, there are some cases where a user's operational error, simple environment setting error or the like tends to cause such a problem as to influence the overall network system. When the problem occurs, the server is incapable of sending a maintenance command to the client. In those cases, there is a fear that not only maintenance cannot be executed but also the system may become inoperable until the system is recovered. The fear grows as the number of clients connecting to the server increases. With the network system becoming larger, there is no ignoring economical damages this may cause.

Moreover, the infection of computer viruses is recently becoming a serious problem to the system using a plurality of general purpose computers as clients and a server such as a client/server system. Namely, when a computer virus enters a general purpose computer serving as one of the plural clients in the client/server system, then the virus spreads over all clients and the server via the network, thus entailing a big loss. Considering this, to comfortably operate the client/server system, it is vital to efficiently execute system maintenance.

Meanwhile, for the maintenance of respective clients in the conventional client/server system, there has been adopted a so-called top-down method, i.e., the method in which a user stores necessary information about maintenance in the server and a maintenance command is issued from the server. In this top-down method, however, the maintenance command is basically issued to all clients connecting to the server all at once. Owing to this, every time maintenance work is being done, excessive loads are imposed on the server and the transmission path. During that time, all clients is inoperative simultaneously, with the result that the overall system performance is disadvantageously lowered.

As can be understood from the above, the conventional client/server system requires maintenance work and the maintenance time largely depends on the maintenance capability of the server or the communication capability of the transmission path. When a problem occurs, clearing up the cause has to depend on the capability of the user or of maintenance personnel. As a result, not only the recovery of the system cannot be expected quickly but also this eventually troubles the user and maintenance personnel.

Under these circumstances, the inventor of the present application filed an invention identified as Japanese Patent Application Laid-Open No. 8-272643. According to the Japanese Patent Application Laid-Open No. 8-272643, self-maintenance capability is provided to clients, with which individual clients make self-diagnoses when powered, and only when some problem occurs, only necessary file(s) is downloaded from the backup system of the clients stored in the server and the self-repair processing is carried out. The Japanese Patent Application Laid-Open No. 8-272643 is thus designed to reduce loads imposed on the server and the transmission paths, to decrease the probability that the system becomes inoperative and to enhance the overall system capability by allowing the respective clients to execute self-maintenance.

Nevertheless, there are many cases recently where the size of software installed into clients is as large as that in units of 100 MB. This requires increasing the capacity of the memory of the server. In addition, when such software are downloaded from the server into the clients, the higher loads are imposed on the transmission paths. This causes the lowering of system response and many clients requiring maintenance have to wait due to delayed response. For that reason, when the number of clients increases, it is necessary to review the capability of the server and that of the transmission paths and to redesign them. In some cases, there is a fear that the number of the clients cannot be even increased.

BRIEF SUMMARY OF THE INVENTION

The present invention has been made in view of these circumstances. In short, it is an object of the present invention to provide a recording medium recording computer program for the client/server system and the clients thereof capable of reducing loads imposed on the overall system during the maintenance of clients, by backup-storing files, which need to be repaired many times, have a large size and are repaired with high frequency, in the clients themselves to prevent these files from being transferred on the transmission paths.

It is also an object of the present invention to provide a computer used as a client of the above-stated client/server system.

Furthermore, the present invention relates to a recording medium recording computer program for allowing such a computer to execute self-maintenance.

A client/server system according to the present invention is a client/server system including a server computer and a client computer connected to a network, wherein the server computer comprises a storing unit which stores information necessary for repairing/updating software of the client computer; and the client computer comprises means for diagnosing as to whether or not the software of the client computer itself needs to be repaired/updated by the server computer; means for inquiring of the server computer about a load state of the server computer; and means for requesting repair/update processing to the server computer when the load state of the server computer falls within a predetermined condition.

In the client/server system of the present invention as stated above, the client computer diagnoses as to whether or not the client computer needs to be repaired/updated by the server computer, inquires of the server computer about the load state of the server computer, and requests repair/update processing to the server computer when the load state of the server computer a predetermined condition. Due to this, only when the server has margin, information necessary for repairing/updating the client computer is transferred from the storing unit of the server computer to the client computer.

The client/server system according to the present invention with the above-stated structure, further comprises load condition storing means for storing, as the predetermined condition, at least one of the number of client computers connected to the server computer, and a size of a file to be transferred to the client computers.

In the client/server system of the present invention as stated above, at least one of the number of client computers connected to the server computer and the size of the file to be transferred to the client computers is read as a predetermined condition, from the load condition storing means provided to the client computer. The predetermined condition thus read is used to be compared with the load state of the server computer judged by the server load judging means.

Moreover, a client computer according to the present invention is a client computer connected, through a network, to a server computer comprising a storing unit which stores necessary information for repairing/updating software of another computer, the client computer comprising: means for diagnosing as to whether or not software of the client computer needs to be repaired/updated by the server computer; means for inquiring of the server computer about a load state of the server computer; and means for requesting repair/update processing to the server computer when the load state of the server computer falls within a predetermined condition.

The client computer of the present invention, as stated above, diagnoses as to whether or not the client computer needs to be repaired/updated by the server computer, inquires of the server computer about the load state of the server computer, and requests repair/update processing to the server computer when the load state of the server computer a predetermined condition. Due to this, only when the server has margin, information necessary for repairing/updating the client computer is transferred from the storing unit of the server computer to the client computer.

In addition to the above-stated structure, the client computer according to the present invention further comprises load condition storing means for storing, as the predetermined condition, at least one of the number of client computers connected to the server computer, and a size of a file to be transferred to the client computers.

In the client computer of the present invention as stated above, at least one of the number of client computers connected to the server computer and the size of the file to be transferred to the client computers is read as a predetermined condition, from the load condition storing means provided to the client computer itself. The predetermined condition thus read is used to be compared with the load state of the server computer judged by the server load judging means.

Further, a recording medium according to the present invention is a computer readable recording medium which records computer program for causing a client computer to execute self-maintenance, the client computer connected, through a network, to a server computer comprising a storing unit storing information necessary for repairing/updating software of another computer, the computer program including: computer readable program code means for causing a client computer to diagnosing as to whether or not software of a client computer needs to be repaired/updated by the server computer; computer readable program code means for causing a client computer to inquire of the server computer about a load state of the server computer; and computer readable program code means for causing a client computer to request repair/update processing to the server computer when the load state of the server computer falls within a predetermined condition.

When the program code means recorded in the recording medium of the present invention, as stated above, is read by the client computer, then a diagnosis is made as to whether or not the client computer needs to be repaired/updated by the server computer, the server computer is asked about the load state of the server computer, and repair/update processing is requested to the server computer when the load state of the server computer a predetermined condition.

In addition to the above-stated structure, the computer program recorded in the recording medium according to the present invention further includes computer readable program code means for causing a client computer to read, as the predetermined condition, at least one of the number of client computers connected to the server computer, and a size of a file to be transferred to the client computers, from the load condition storing means provided to the client computer itself.

When the recording medium recorded in the present invention, as stated above, is read by the client computer, at least one of the number of client computers connected to the server computer and the size of the file to be transferred to the client computers is read as a predetermined condition by the client computer.

The above and further object and features of the invention will more fully be apparent from the following detailed description with accompanying drawings.

BRIEF DESCRIPTION OF THE DRAWING

FIG. 5 is a typical view showing the contents of the computer program recorded in a recording medium according to the present invention and installed into the computer serving as a client unit of the client/server system according to the present invention.

DESCRIPTION OF THE PREFERRED EMBODIMENTS

Figure 1:
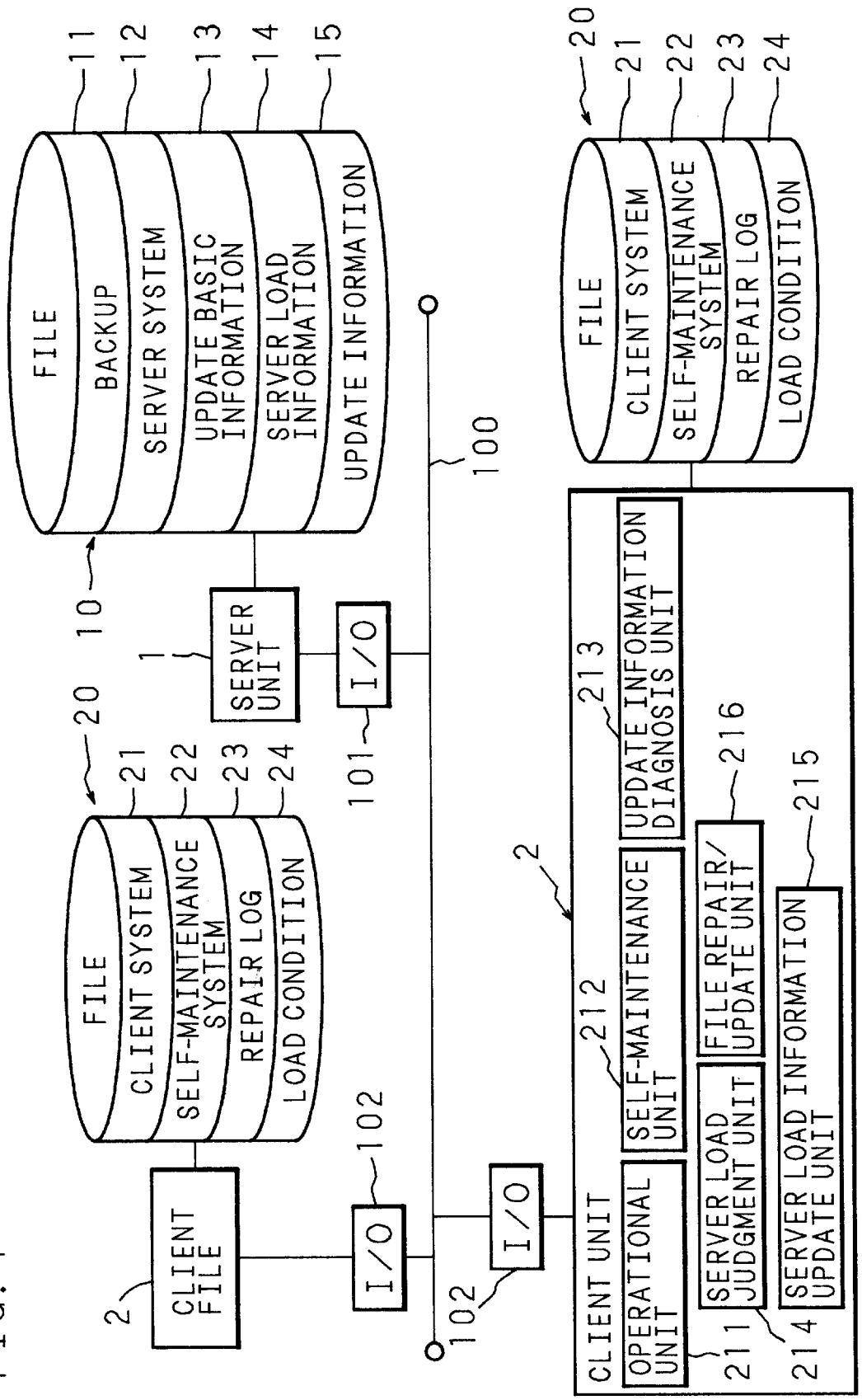
FIG. 1 is a typical view showing an example of the overall structure of a client/server system according to the present invention.

The present invention will now be described in detail with reference to the drawings illustrating the embodiments thereof. FIG. 1 is a typical view showing an example of the overall structure of a client/server system according to the present invention.

In FIG. 1, reference numeral 100 denotes a LAN line and reference numerals 1 and 2 denote a server computer (to be referred to as a "server unit" hereinafter) and a client computer (to be referred to as a "client unit" hereinafter), respectively. They are all connected to the LAN line 100, all of which constitutes a network system as a whole. It is noted that a plurality of server units 1 and a plurality of client units 2 can be connected to a single LAN line 100. For the sake of illustration, FIG. 1 shows a case where one server unit 1 and two client units 2 are connected to the LAN line 100.

The client unit 2 is a computer of the present invention. It functions as the client unit 2 of the client/server system according to the present invention by reading program codes from a recording medium according to the present invention to be described later.

Each of the server unit 1 and the client unit 2 is a general purpose computer provided with a CPU, a memory, a disk unit (such as a hard disk and a flexible disk), a printer, a display, a keyboard, a mouse and the like as hardware. Large quantity storage media 10 and 20 utilizing hardware, such as a hard disk and a magnetic tape, are connected to each unit and various software are installed into the unit.

The server unit 1 and the client unit 2 are connected to the LAN line 100 by an I/O interface 101 and an I/O interface 102 as a hardware, respectively.

In the storage medium 10 of the server unit 1, file structure information, such as a backup file 11 of a client, a server system file 12, an update basic information file 13, a server load information file 14 and an update information file 15, and the like are stored.

The backup file 11 stores data for backing up files of a client system which are common to the client units 2. The server system file 12 stores file structure software of various types necessary for the operation of the server unit 1 itself. The update basic file information 13 stores file structure information such as information to be updated in the client unit 2, specifically, information on the file size and the number of files of resources to be newly distributed from the server unit 1 to the client units 2. The server load information file 14 stores file structure information on the current load state of the server unit 1, specifically, the number of connected client units 2 and the size of files waiting for processing. The update information file 15 stores resources themselves, in the form of files, to be newly distributed from the server unit 1 to the client units 2. Information on the file size and the number of the files are stored in the update basic information file 13 as mentioned above.

The storage medium 20 of the client unit 2 stores file structure information such as a client system file 21, a self-maintenance system file 22, a repair log file 23, a load condition file 24, and the like.

The client system file 21 stores file structure software of various types necessary for the client unit 2. When the software are executed by the client unit 2, the client system file 21 functions as an operational unit 211. When ordinary application software such as, for example, a word processor, a spreadsheet, and the like, stored in the client system file 21 are executed by the client unit 2, then the operational unit 211 executes the functions of the software.

The self-maintenance system file 22 stores file structure software of various types necessary for the self-maintenance of the client unit 2 itself. When the software are executed by the client unit 2, the self-maintenance system file 22 function as a self-diagnosis unit 212, an update information diagnosis unit 213, a server load judgment unit 214, a server load information update unit 215, and a file/repair update unit 216.

The self-diagnosis unit 212 executes a self-diagnosis of the client unit 2 itself at appropriate timing such as when the power is turned on or when a user issues a request. The update information diagnosis unit 213 judges whether or not resources to be newly distributed from the server unit 1 to the client unit 2 itself are present by inquiring of the server unit 1 through the LAN line 100. The server load judgment unit 214 judges the current load state of the server unit 1 by procedures described hereinafter. The server load information update unit 215 updates the content of the server load information file 14 of the server unit 1 as the need arises. The file repair/update unit 216 issues a file repair request or a file update request to the server unit 1 through the LAN line 100, as the need arises. When received a file repair request from the file repair/update unit 216, the server unit 1 reads a corresponding file from the backup file 11 and transfers it to the client unit 2. When received a file update request from the file repair/update unit 216, the server unit 1 reads the content of the update information file 15 and transfers it to the client unit 2.

The repair log file 23 is a working file for temporarily recording the result of a self-diagnosis of the server unit 1, when the self-diagnosis is executed by the self-diagnosis unit 212. The repair log file 23 records information identifying a file which is judged to need a repair and the file size thereof.

The load condition file 24 records pre-set conditions for allowing the client unit 2 to use the server unit 1. These conditions can be appropriately modified. The conditions involve, for example, the "connected unit numbers" indicating the number of client units 2 actually connected to the server unit 1 through the LAN line 100 at this moment (note, when the number of the units 2 is equal to or less than the "connected unit numbers", the client units 2 can connect to the server unit 1), the "process waiting file size" indicating the data quantity of all files waiting for being transferred to the client units 2 from the server unit 1 (note, when the file size is equal to or less than the "process waiting file size", the client unit 2 can connect to the server unit 1), and "process waiting time/frequency" indicating time or process frequency for all series of processing which have been already reserved at this moment to be finished.

Figure 2A:
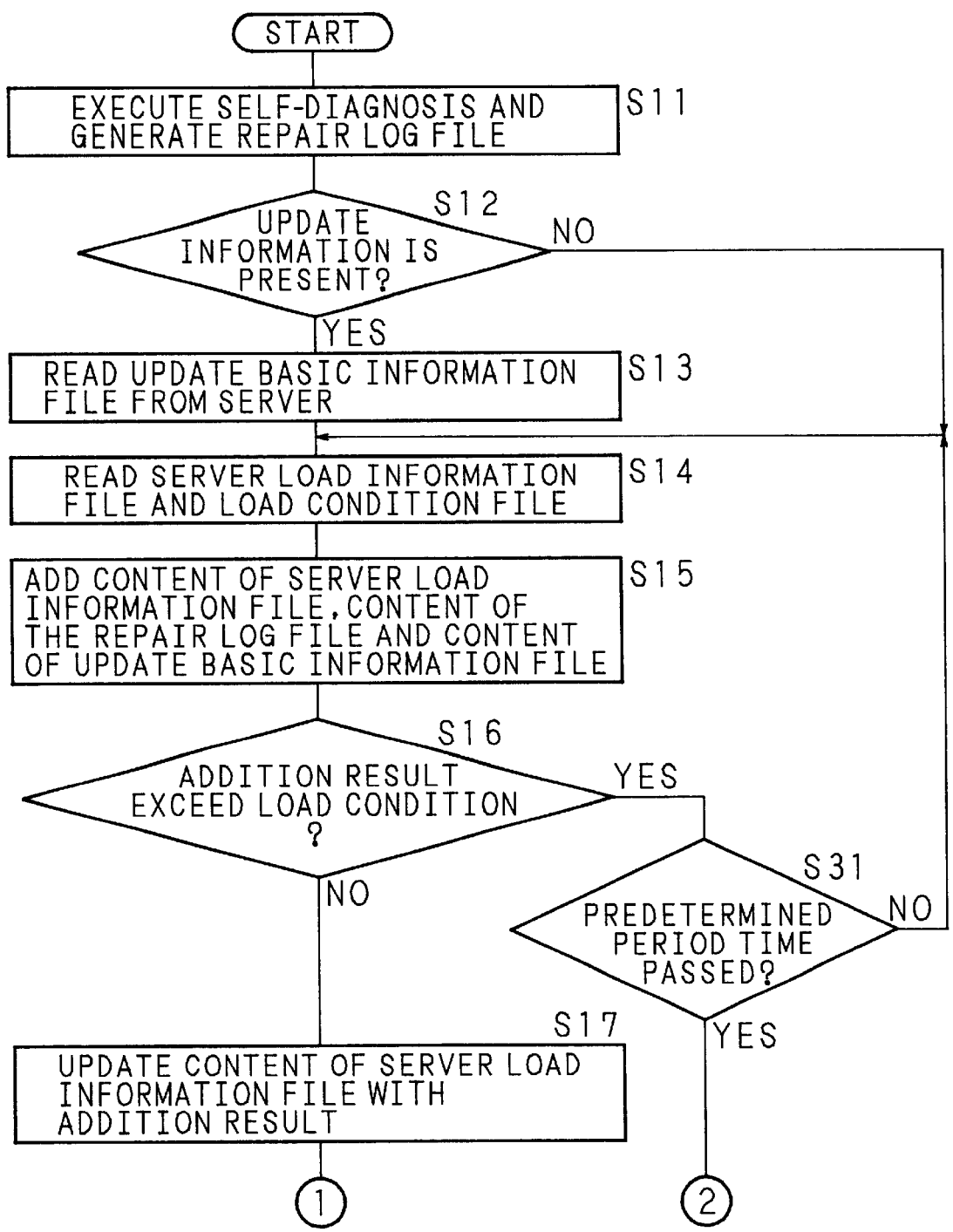
FIG. 2A and FIG. 2B are flow charts showing procedures for self-maintenance by the client unit of the client/server system according to the present invention.
Figure 2B:
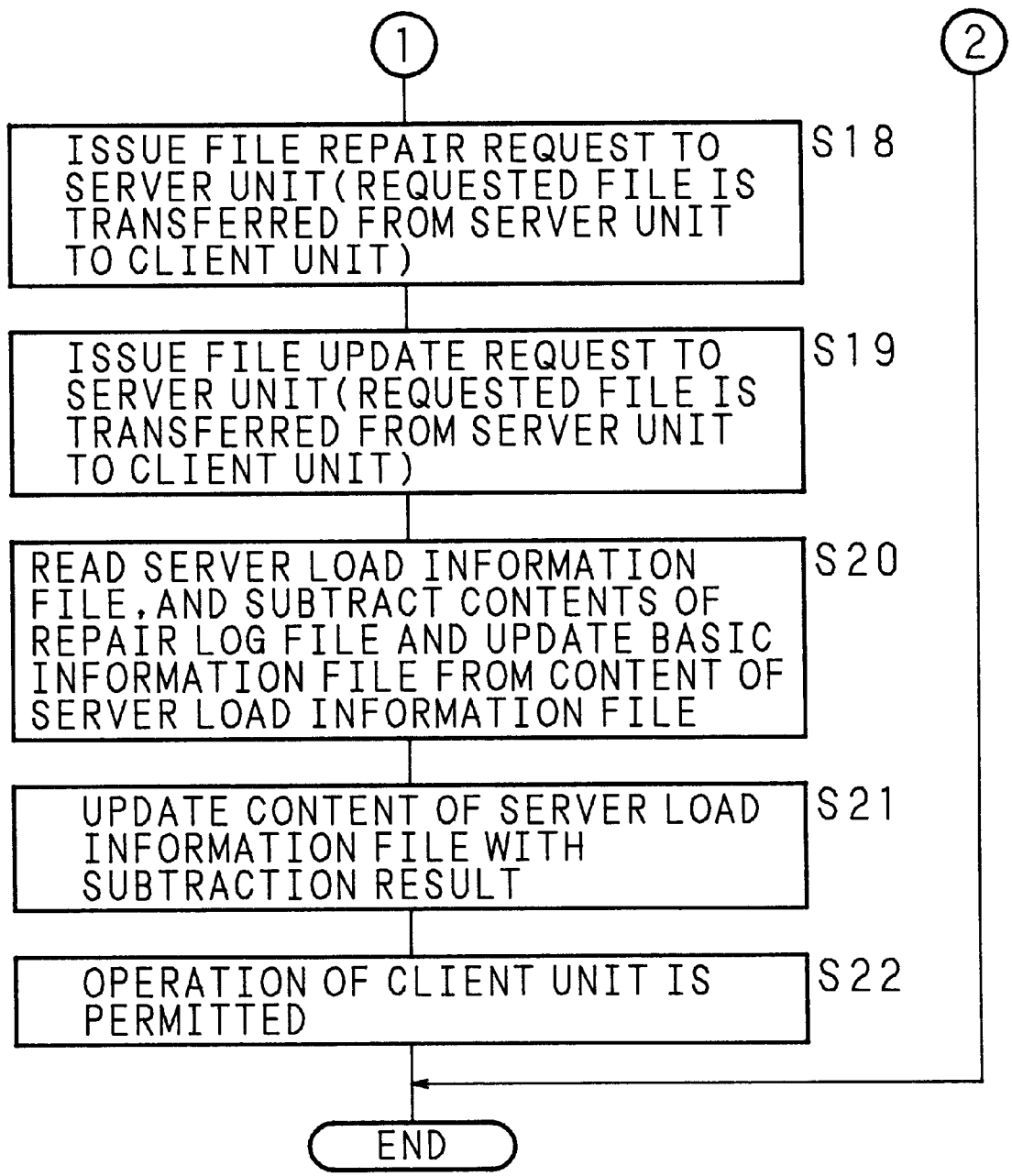

Next, the operation of the client/server system according to the present invention during the self-maintenance of the client will be described with reference to the flow charts of FIG. 2A and FIG. 2B showing their processing procedures.

When a certain client unit 2 is activated by turning its power on, the self-diagnosis unit 212, the update information diagnosis unit 213, the server load judgment unit 214, the server load information update unit 215, and the file repair/update unit 216 are activated by the software stored in the self-maintenance system file 22 of the client unit 2 for executing a self-diagnosis. First, the self-diagnosis unit 212 executes the self-diagnosis of the client unit 2 (step S11). In this embodiment, self-maintenance can be also executed at any timing by being given a request from the user, in addition to at the timing at which the power is on, as long as it is timing at which maintenance processing is made possible.

When the self-diagnosis unit 212 executes a self-diagnosis, a repair log file 23 recording the result of the self-diagnosis is generated. More specifically, the self-diagnosis unit 212 makes a diagnosis as to the system environment of the client unit 2, i.e., whether the file of software, farm-ware or the like needs to be repaired. Information for identifying the file needed to be repaired, the size of the file and the like are recorded in the repair log file 23.

Figure 3A:
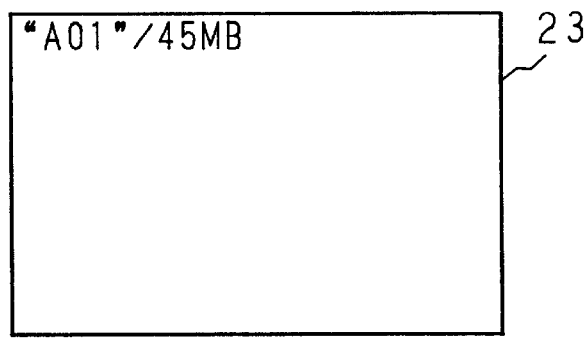
FIG. 3A, FIG. 3B, FIG. 3C, FIG. 3D and FIG. 3E are typical views showing the contents of files during self-maintenance by the client unit of the client/server system according to the present invention.

FIG. 3A is a typical view showing an example of the content of the repair log file 23 generated as a result of the self-diagnosis by the self-diagnosis unit 212. In this case, the repair log file 23 records that the file "A01" needs to be repaired and that its file size is 45 MB.

Next, the update information diagnosis unit 213 examines whether or not update information (resources to be newly distribute) is present (step S12). As described above, the update information, when present, is stored in the update information file 15 of the server unit 1. When some information is stored in the update information file 15 of the server unit 1 through the LAN line 100, then it means that the update information is present. When update information exists ("YES" in step S12), then the update information diagnosis unit 213 reads basic information of the update information, i.e., update basic information such as the file size and the number of files of distribution resources, from the update basic information file 13 of the server unit 1 (step S13).

Figure 3B:
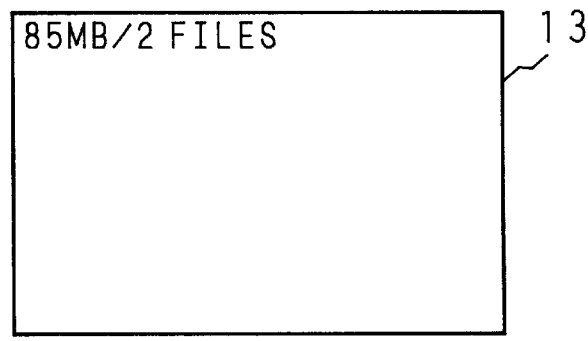

FIG. 3B is a typical view showing an example of the content of the update basic information file 13. In this case, it is recorded in the file 13 that two files are present as newly distribution resources and that the file size is 85 MB.

When it is judged that no update information exists ("NO" in step S12), process goes on to the next step S14. In step S14, the server load judgment unit 214 reads the server load information file 14 from the server unit 1 and, at the same time, reads the load condition file 24 of the client unit 2 itself.

Figure 3C:
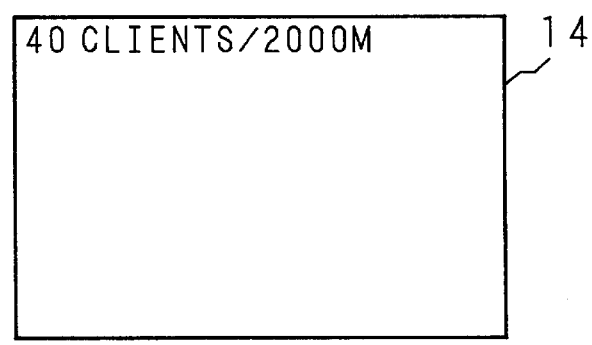

The server load information file 14 stores, as described above, file structure information on the current load state of the server unit 1, specifically, of the number of connected client units 2 and the size of process waiting files. FIG. 3C is a typical view showing an example of the content of the server load information file 14. In this case, the file 14 records as the current load state of the server unit 1, that the number of connected client units 2 is 40 and the size of files waiting for processing is 2000 MB.

The load condition file 24 stores, as described above, conditions for allowing the client unit 2 to use the server unit 1, such as "connected unit number" indicating the number of the client units 2 actually connected through the LAN line 100 at this moment, "the process waiting file size" which is the data quantity of all files waiting for being transferred from the server unit 1 to the client units 2 at this moment and "process waiting time/frequency" indicating time or process frequency for all series of processing which have been already reserved at this moment to be finished.

Figure 3D:
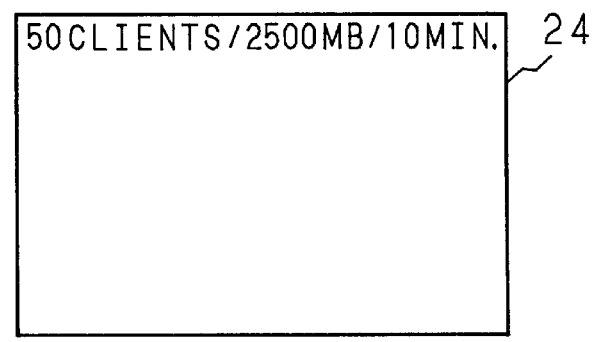

FIG. 3D is a typical view showing an example of the content of the load condition file 24. In this case, the file 24 records as the load state of the server unit 1 for allowing the client unit 2 to use the server unit 1, that the number of client units 2 is 50 (or less) and that the size of files waiting for processing is 2500 MB (or less).

Next, the server load judgment unit 214 adds the content of the server load information file 14, the content of the repair log file 23 which has been obtained as the result of the self-diagnosis by the self-diagnosis unit 212 in advance, and the content of the update basic information file 13 which is read from the server unit 1 (step S15). The server load judgment unit 214 then compares the addition result with the content of the load condition file 24. As a result of this comparison, when the addition result does not exceed the content of the load condition file 24 ("NO" in step S16), then it means that the server unit 1 has margin to respond to a process request from the client unit 2. In that case, the server load judgment unit 214 updates the content of the server load information file 14 with the addition result (step S17).

Figure 3E:
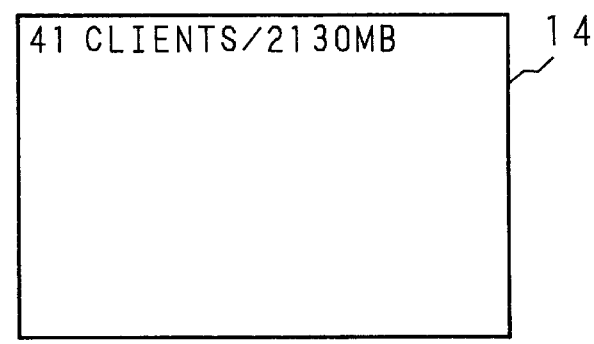

In the above example, when the content of the server load information file 14, the content of the repair log file 23, and the content of the update basic information file 13, then the file size amounts to "45 MB+85 MB+2000 MB"=2130 MB and the number of client units 2 becomes 41. They do not exceed the content of the load condition file 24 (2500 MB and 40 clients). The content of the server load information file 14 is therefore as shown in the typical view of FIG. 3E. At this moment, the content of the server load information file 14 of the server unit 1 has a load state in which new repair/update processing is executed to the client unit 2 in addition to the prior load state.

Next, the file repair/update unit 216 issues a file repair request to the server unit (step S18). In response to the request, the server unit 1 reads the requested file from the backup file 11 of the server unit 1 and transfers the file to the client unit 2. As a result, the file which has been diagnosed as requiring a repair by the self-diagnosis unit 212 earlier within the client system file 21 is repaired. Furthermore, when it is judged in advance that the update information diagnosis unit 213 judges that update information exists, the file repair/update unit 216 issues a file update request to the server unit 1 (step S19). In response to this request, the server unit 1 transfers a requested file (which is, in this case, a file of new distribution resources stored in the update information file 15 of the server unit 1) to the client unit 2. As a result, a file of the new resource is stored in the client system file 21 of the client unit 2.

As described above, the file within the client system file 21 which has been judged to be needed to be repaired in accordance with the result of the self-diagnosis by the self-diagnosis unit 212 is repaired, and the file which has been judged to be needed to be updated by the update information diagnosis unit 213 is downloaded into the client system file 21. Thereafter, the server load information update unit 215 reads once again the server load information file 14 of the server unit 1. The unit 215 subtracts the content of the repair log file 23 and that of the update basic information file 13 from the content of the server load information file 14 (step S20), and updates the content of the server load information file 14 with the subtraction result (step S21).

At this moment, the content of the server load information file 14 of the server unit 1 returns to a state shown in the typical view of FIG. 3C when a repair/update request from another client unit 2 is not accepted. However, it turns into a different state when the repair/update request from another client system 2 is accepted. In either case, the load state is changed from a load state in which repair/update processing has been executed to the client unit(s) 2 until that moment, to a load state with larger margin in which no repair/update processing is executed to the client units 2. Therefore, when a new repair/update processing request is issued from another client unit 2 to the server unit 1, the request can be accepted more easily.

When the content of the server load information file 14 of the server unit 1 is updated in step S21 as described above, then the operation of the client unit 2 is permitted (step S22).

In the above-stated step S16, when the addition result exceeds the content of the load condition file 24 ("YES" in step S16), then process returns to the step S14 and waits for the load of the server unit 1 to decrease for a predetermined period time ("NO" in step S31). When the predetermined period time has passed ("YES" in step S31), then process goes on to the above-stated step S22 and it is permitted that the client unit 2 starts operation. In this case, although the client cannot operate the file needed to be repaired/updated, the client unit 2 can operate in a case where such a file is not needed.

In the meantime, the above-stated client/server system according to the present invention is realized by installing software program recorded in the recording media for self-maintenance into a general purpose computer serving as the client unit 2.

Figure 4:
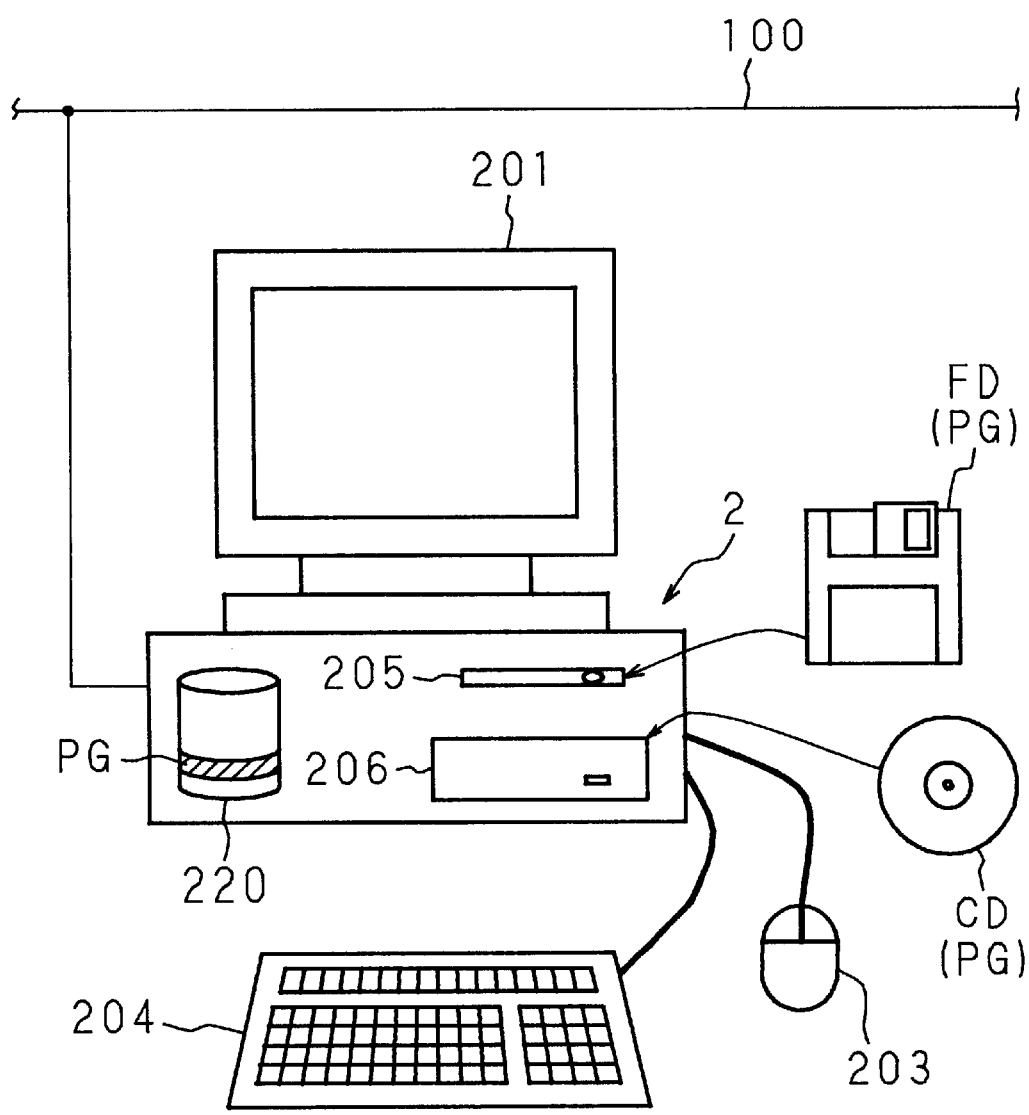
FIG. 4 is a typical view showing an example of the structure of a computer serving as a client unit of the client/server system according to the present invention.

FIG. 4 is a typical view showing the outline of a general purpose computer serving as the client unit 2. The general purpose computer is provided with a flexible disk drive 205 for reading out the recording content (program codes) from a flexible disk FD storing the above-stated self-maintenance program PG and/or a CD-ROM drive 206 for reading the recording content (program codes) from a CD-ROM recording the above-stated processing program PG.

Reference numeral 201 denotes a display device such as a CRT display. Reference numeral 203 denotes a pointing device such as a mouse, and 204 denotes an input device such as a keyboard.

The code of the program PG read from the flexible disk FD by the flexible disk drive 205 or the code of the program PG read from the CD-ROM by the CD-ROM drive 206 is installed into, for example, the storage medium 20 utilizing a hard disk, and functions as the self-diagnosis unit 212, the update information diagnosis unit 213, the server load judgment unit 214, the server load information update unit 215, and the file repair/update unit 216, as described previously.

The flexible disk FD and/or CD-ROM are shown as recording media herein. The recording media, however, should not be limited thereto. A magnetic tape, a magneto-optical disc and the like can be, of course, employed as recording media by combining them with appropriate drives (reading means).

FIG. 5 is a typical view showing the content of program PG recorded in the flexible disk FD which is an example of a recording medium.

The flexible disk FD shown in FIG. 5 is a computer readable recording medium recording computer program for causing the client computer (client unit 2), which is provided with the client system file 21 storing the backup files of the software installed into the client computer itself, to execute self-maintenance. The client computer (client unit 2) is connected to the server computer via the network. The server computer is provided with the backup file 11 storing the backup files of software installed into another computer (server unit 1), the update information file 15 storing the file of a software when the software to be installed into another computer (server unit 1) exists, the update basic information file 13 storing information indicating a load when a file stored in the update information file 15 is installed into another computer (server unit 1), and the server load information file 14 storing information indicating a load state for repair/update processing to another computer (server unit 1).

The specific contents of the computer program is as follows. The flexible disk FD contains a program code (PC11) for causing the client computer (client unit 2) to diagnose as to whether or not a file of the software stored in the client system file 21 needs to be repaired, a program code (PC12) for causing the client computer (client unit 2) to store information indicating the load of the server computer (server unit 1) when the file diagnosed as requiring a repair is to be installed from the backup file 11 of the server computer (server unit 1), a program code (PC13) for causing the client computer (client unit 2) to diagnose as to whether or not the file of the software for the client system file 21 needs to be updated, a program code (PC14) for causing the client computer (client unit 2) to judge the load state of the server computer (server unit 1) from the content of the repair log file 23, the contents of the update basic information file 13 and the server load information file 14 of the server computer (server unit 1), a program code (PC15) for causing the client computer (client unit 2) to update the content of the server load information file 14 of the server computer (server unit 1) when the load state of the server computer (server unit 1) thus judged predetermined conditions, and a program code (PC16) for causing the client computer (client unit 2) to read the file diagnosed as requiring repair processing and the file diagnosed as requiring update processing from the backup file 11 and the update information file 15 of the server computer (server unit 1) and to store them in the client system file 21 of the client computer (client unit 1) itself when the load state of the server computer (server unit 1) thus judged predetermined conditions.

The flexible disk FD shown in FIG. 5 also contains a program code (PC17) for causing the client computer (client unit 2) to read from the load condition file 24 provided to the client computers themselves, as a predetermined condition, at least one of the number of client computers connected to the server computer (server unit 1) and the size of files to be transferred to the client computers.

In the above embodiment, a certain client unit may be given a priority and the server unit may preferentially executes repair/update processing to the client unit given such a priority.

As described so far, according to the client/server system of the present invention, a repair/update request from a client is accepted only when the server has margin equal to or more than a certain level. Therefore, even when the number of clients increases, there is no need to review the capability of the server and that of the transmission paths and then re-design them, or there is no fear that, for example, the number of clients cannot be increased.

According to the client computer of the present invention, a repair/update request is accepted only when the server has margin equal to or more than a certain level. Therefore, even when the number of clients increases, there is no need to review the capability of the server and that of the transmission paths and then re-design them, or there is no fear that, for example, the number of clients cannot be increased.

Furthermore, according to the recording media of the present invention, by reading a program code by the client computer, it is enable to function general computers as the client/server system of the present invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of claims, or equivalence of such metes and bounds thereof are therefore intended to be embraced by the claims.

What is claimed is:

1. A client/server system including a server computer and a client computer connected to a network, wherein
    said server computer comprises a storing unit which stores information necessary for repairing/updating software of said client computer; and
    said client computer comprises means for diagnosing as to whether or not the software of said client computer itself needs to be repaired/updated by said server computer; means for inquiring of said server computer about a load state of said server computer; and means for requesting repair/update processing to said server computer when the load state of said server computer falls within a predetermined condition.

2. A client/server system including a server computer and a client computer connected to a network, wherein said server computer comprises:
    backup storing means for storing a backup file necessary for repairing software installed into said client computer;
    update information storing means for storing an update file necessary for updating software of said client computer;

update basic information storing means for storing information indicating a load when the file stored in said update information storing means is installed into said client computer; and server load information storing means for storing information indicating a load state of said server computer itself, and said client computer comprises:

client system storing means for storing the software installed in said client computer;

self-diagnosing means for diagnosing as to whether or not a file of the software installed into said client system storing means needs to be repaired;

repair log storing means for storing information indicating a load of said server computer when the file diagnosed as requiring repair by said self-diagnosing means is installed from said backup storing means of said server computer;

update information diagnosing means for diagnosing as to whether or not the file of the software to said client system storing means needs to be updated;

server load judging means for judging the load state of said server computer from a content of said repair log storing means, a content of said update basic information storing means of said server computer and a content of said server load information storing means of said server computer;

server load information updating means for updating a content of said server load information storing means of said server computer when the load state of said server computer judged by said server load judging means falls within a predetermined condition; and file repairing/updating means, when the load state of said server computer judged by said server load judging means falls within the predetermined condition, for reading the file diagnosed as requiring repair by said self-diagnosing means and the file diagnosed as requiring update by said update information diagnosing means from the backup storing means and the update information storing means of said server computer, and for storing the files in said client system storing means of said client computer itself.

3. The client/server system as set forth in claim 2, wherein said client computer further comprises load condition storing means for storing, as said predetermined condition, at least one of the number of client computers connected to said server computer, and a size of a file to be transferred to said client computers.

4. A client computer connected, through a network, to a server computer comprising a storing unit which stores necessary information for repairing/updating software of another computer, said client computer comprising:

means for diagnosing as to whether or not software of said client computer needs to be repaired/updated by said server computer;

means for inquiring of said server computer about a load state of said server computer; and means for requesting repair/update processing to said server computer when the load state of said server computer falls within a predetermined condition.

5. A client computer connected, through a network, to a server computer comprising: backup storing means for storing a backup file necessary for repairing software installed into another computer; update information storing means for storing an update file necessary for updating the software of another computer; update basic information storing means for storing information indicating a load when the file stored in said update information storing means is installed into another computer; and server load information storing means for storing information indicating a load state of said server computer itself, said client computer comprising:

client system storing means for storing the software installed in said client computer;

self-diagnosing means for diagnosing as to whether or not a file of the software installed into said client system storing means needs to be repaired;

repair log storing means for storing information indicating a load of said server computer when the file diagnosed as requiring repair by said self-diagnosing means is installed from said backup storing means of said server computer;

update information storing means for diagnosing as to whether or not the file of the software to said client system storing means needs to be updated;

server load judging means for judging the load state of said server computer from a content of said repair log storing means, a content of said update basic information storing means of said server computer, and a content of said server load information storing means of said server computer;

server load information updating means for updating a content of said server load information storing means of said server computer when the load state of said server computer judged by said server load judging means falls within a predetermined condition; and file repairing/updating means, when the load state of said server computer judged by said server load judging means falls within the predetermined condition, for reading the file diagnosed as requiring repair by said self-diagnosing means and the file diagnosed as requiring update by said update information diagnosing means from said backup storing means and the update information storing means of said server computer, and for storing the files in said client system storing means of said client computer itself.

6. The client computer as set forth in claim 5, further comprising load condition storing means for storing, as said predetermined condition, at least one of the number of client computers connected to said server computer, and a size of a file to be transferred to said client computers.

7. A computer readable recording medium which records computer program for causing a client computer to execute self-maintenance, said client computer connected, through a network, to a server computer comprising a storing unit storing information necessary for repairing/updating software of another computer, said computer program including:

computer readable program code means for causing a client computer to diagnosing as to whether or not software of a client computer needs to be repaired/updated by said server computer;

computer readable program code means for causing a client computer to inquire of said server computer about a load state of said server computer; and computer readable program code means for causing a client computer to request repair/update processing to said server computer when the load state of said server computer falls within a predetermined condition.

8. A computer readable recording medium which records computer program for causing a client computer comprising client system storing means for storing software installed into said client computer to execute self-maintenance, said client computer connected, through a network, to a server computer comprising: backup storing means for storing a backup file necessary for repairing software installed into another computer; update information storing means for storing an update file necessary for updating the software of another client computer; update basic information storing means for storing information indicating a load when the file stored in said update information storing means is installed into another computer; and server load information storing means for storing information indicating a load state of said server computer itself, said computer program including;

computer readable program code means for causing a client computer to diagnose as to whether or not a file of the software installed into said client system storing means needs to be repaired;

computer readable program code means for causing a client computer to store information indicating a load of said server computer when the file diagnosed as requiring repair by said self-diagnosing means is installed from said backup storing means of said server computer;

computer readable program code means for causing a client computer to diagnose as to whether or not the file of the software to said client system storing means needs to be updated;

computer readable program code means for causing a client computer to judge the load state of said server computer from a content of said repair log storing means, a content of said update basic information storing means of said server computer and a content of said server load information storing means of said server computer;

computer readable program code means for causing a client computer to update a content of said server load information storing means of said server computer when the judged load state of said server computer falls within a predetermined condition; and computer readable program code means for causing a client computer, when the judged load state of said server computer falls within the predetermined condition, to read the file diagnosed as requiring repair by said self-diagnosing means and the file diagnosed as requiring update by said update information diagnosing means from said backup storing means and said update information storing means of said server computer, and to store the files in said client system storing means of said client computer itself.

9. The recording medium as set forth in claim 8, wherein said computer program further including computer readable program code means for causing a client computer to read, as said predetermined condition, at least one of the number of client computers connected to said server computer, and a size of a file to be transferred to the client computers, from said load condition storing means provided to said client computer itself.

* * * * *